United States Patent [19]

Yoon

[11] Patent Number: 4,476,818
[45] Date of Patent: Oct. 16, 1984

[54] CONSTANT AIR FEED ALCOHOL DISSOCIATION PROCESS FOR AUTOMOBILES

[75] Inventor: Heeyoung Yoon, McMurray, Pa.

[73] Assignee: Conoco Inc., Wilmington, Del.

[21] Appl. No.: 543,542

[22] Filed: Oct. 19, 1983

Related U.S. Application Data

[63] Continuation-in-part of Ser. No. 414,744, Sep. 3, 1982, Pat. No. 4,425,876.

[51] Int. Cl.³ .......................................... F02M 27/02
[52] U.S. Cl. ................................. 123/3; 123/DIG. 12; 123/557; 123/577; 48/197 R
[58] Field of Search .................. 123/1 A, 3, DIG. 12, 123/577, 557, 525; 48/197 R

[56] References Cited

U.S. PATENT DOCUMENTS

| | | | |
|---|---|---|---|
| 3,828,736 | 8/1974 | Koch | 123/1 A |
| 3,963,000 | 6/1976 | Kosaka et al. | 123/3 |
| 4,021,370 | 5/1977 | Harris et al. | 48/197 R |
| 4,028,067 | 6/1977 | Gent | 48/197 R |
| 4,086,877 | 5/1978 | Henkel et al. | 123/1 A |
| 4,088,450 | 5/1978 | Kosaka et al. | 123/1 A |
| 4,147,142 | 4/1979 | Little | 123/3 |
| 4,170,200 | 10/1979 | Takeuchi et al. | 123/3 |
| 4,230,072 | 10/1980 | Noguchi et al. | 123/3 |
| 4,282,835 | 8/1981 | Peterson et al. | 123/3 |
| 4,340,013 | 7/1982 | Lindstrom | 123/3 |
| 4,366,782 | 1/1983 | Jackson et al. | 123/3 |
| 4,407,238 | 10/1983 | Yoon | 123/3 |
| 4,441,461 | 4/1984 | Yoon, et al | 123/DIG 7 |

*Primary Examiner*—Ethel R. Cross
*Attorney, Agent, or Firm*—Dale Lovercheck; William A. Mikesell, Jr.

[57] ABSTRACT

A method of fuel treatment and distribution for an internal combustion engine including the sequence of steps as follows:

(a) heating a catalyst bed reactor to a start-up temperature using exhaust gas from an internal combustion engine being operated on atomized alcohol; the catalyst bed reactor including a partial combustion catalyst and an alcohol dissociation catalyst;

(b) vaporizing liquid alcohol to form alcohol vapor;

(c) mixing the alcohol vapor with a fixed flow rate of air to form a partial combustion mixture, the flow rate being substantially fixed at about the flow rate required for adiabatic dissociation of the alcohol vapor at the flow rate of the alcohol vapor during idling of the internal combustion engine;

(d) contacting the partial combustion mixture and the partial combustion catalyst and the dissociation catalyst to form a hydrogen-rich fuel;

(e) mixing air and the hydrogen rich fuel to form a total combustion mixture;

(f) burning the total combustion mixture in an internal combustion engine.

8 Claims, 1 Drawing Figure

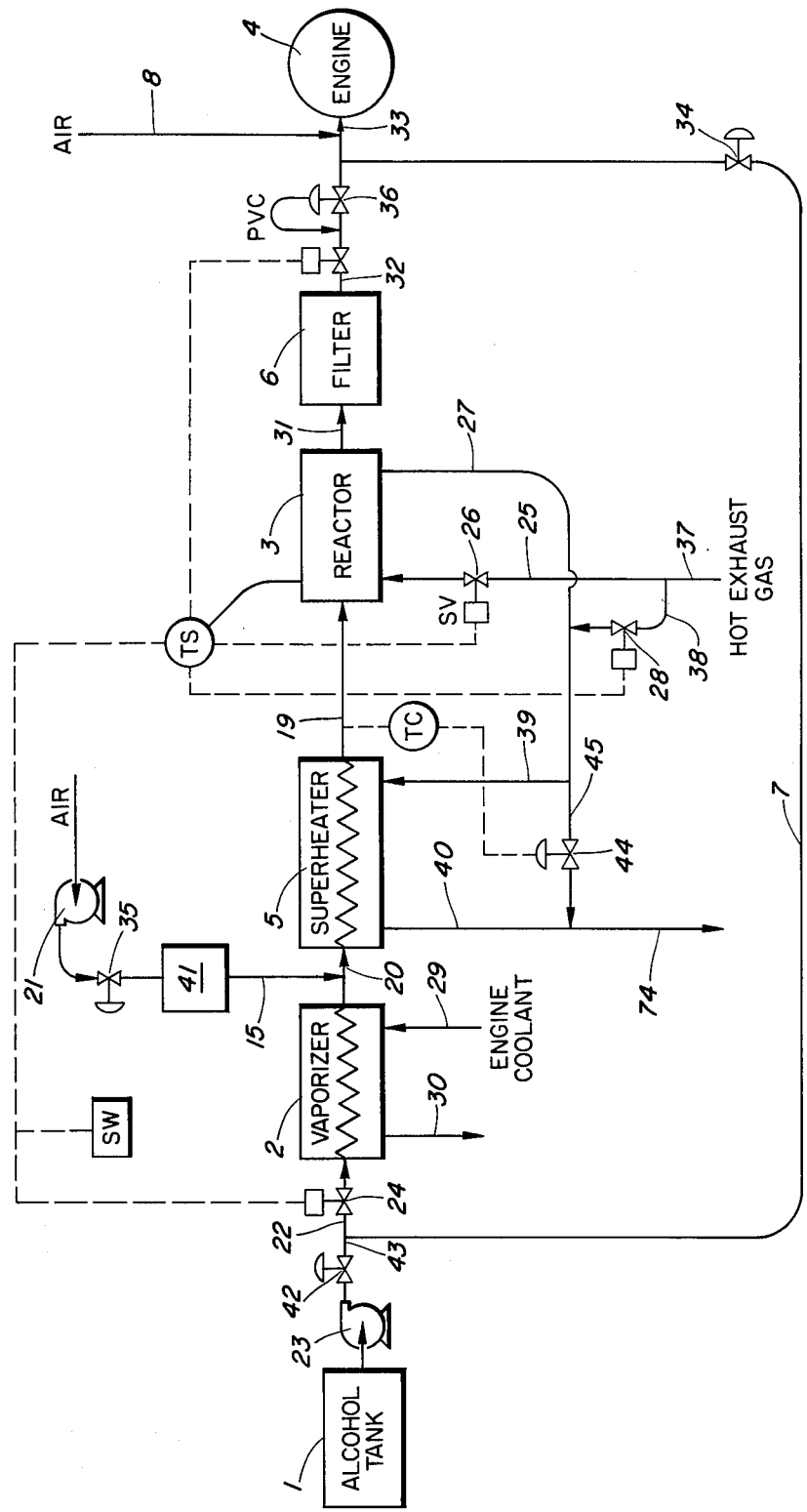

CONSTANT AIR FEED ALCOHOL DISSOCIATION PROCESS FOR AUTOMOBILES

This is a continuation-in-part of U.S. patent application Ser. No. 414,744 filed Sept. 3, 1982, now U.S. Pat. No. 4,425,876.

BACKGROUND OF THE INVENTION

Kosaka et al U.S. Pat. No. 4,088,450 discloses a plurality of catalysts arranged in a desirable order based on the temperature gradient existing in the chamber for reaction. The operating temperature of the catalysts and the temperature of the portion of the reaction chamber it is in, are matched so as to avoid a catalytic degradation and/or catalytic inactivity.

Peterson et al U.S. Pat. No. 4,282,835 provides for synthesizing an $H_2$ fuel from methanol and water in a catalytic process. The methanol is confined in an alcohol tank as a liquid. The water is confined in a water tank. A fuel pump and a water pump force fuel and water to a mixing valve. A heat exchanger heats the fuel and water to a gas which passes through nickel on alumina catalyst at 500° C. where the methanol dissociates to $CO+H_2$. The gas passes to a second synthesizer containing Fe on Alumina catalyst above 500° C. where water and carbon monoxide form hydrogen and carbon dioxide. The gas is then mixed with air and passes to the engine.

SUMMARY OF THE INVENTION

A method of fuel treatment and distribution for an internal combustion engine including the sequence of steps as follows:

(a) heating a catalyst bed reactor to a start-up temperature using exhaust gas from an internal combustion engine being operated on atomized alcohol; the catalyst bed reactor including a partial combustion catalyst and an alcohol dissociation catalyst;

(b) vaporizing liquid alcohol to form alcohol vapor;

(c) mixing the alcohol vapor with a fixed flow rate of air to form a partial combustion mixture, the flow rate being substantially fixed at about the flow rate required for adiabatic dissociation of the alcohol vapor at the flow rate of the alcohol vapor during idling of the internal combustion engine;

(d) contacting the partial combustion mixture and the partial combustion catalyst and the dissociation catalyst to form a hydrogen-rich fuel;

(e) mixing air and the hydrogen rich fuel to form a total combustion mixture;

(f) burning the total combustion mixture in an internal combustion engine.

The partial combustion catalyst and the dissociation catalyst are preferably both Cu/Cr and may each be promoted with Mn.

Benefits of this process include:

It is more thermally efficient than a completely adiabatic process because of some waste heat recovery from the exhaust gas.

The degree of the waste heat recovery required for endothermic conversion is proportional to the available sensible heat in the engine exhaust gas. This allows a high alcohol conversion percentage regardless of the amount of alcohol throughput. This eliminates the potential problem of a low percentage of alcohol conversion because of low exhaust temperature at a low engine load since alcohol is substantially all converted by the adiabatic dissociation reactions at engine idle (i.e. reactions I-III below). Since the air feed rate to the reactor is constant, the air flow control is simple. An orifice may be used to hold the air flow constant where the alcohol is methanol, the reactor converts methanol to a hydrogen rich gaseous fuel with the heat in-situ produced by the partial combustion of methanol (with air) and the sensible heat provided by the hot exhaust gas. At the lowest methanol throughput, the partial combustion provides all the heat requirement for the conversion of the remaining methanol after the combustion (adiabatic conversion). The portion of methanol converted by the sensible heat provided by the exhaust gas increases with the increase in the methanol throughput. The reactor is provided with a catalyst bed effective for the partial combustion and the endothermic dissociation of methanol. The hydrogen rich fuel is fed to the engine for internal combustion.

A by-pass line is provided for directly injecting liquid methanol to provide supplemental engine fuel, for example at operation over 50 mph. This is needed for good engine performance at very high fuel load demands (acceleration, very high speed driving). The supplemental injection of the liquid fuel also makes it unnecessary to size the engine on gaseous fuel for full load performance.

BRIEF DESCRIPTION OF THE DRAWING

The drawing is a schematic flow diagram of an automobile fuel system in accordance with the present invention.

DETAILED DESCRIPTION OF THE INVENTION

With more particular reference to the drawing, it is seen that the reactor 3 is connected by conduit 19 to a super-heater 5. The superheater 5 receives vapor phase alcohol from the vaporizer 2 through line 20. Air is pumped through line 15 from compressor 21 into line 20. The mixture of air and methanol vapor passes through line 20 to the superheater 5. Alcohol from the alcohol tank is pumpted through line 22 by pump 23 to the vaporizer 2. Valve 24 in line 22 is provided to limit the flow of liquid alcohol to the vaporizer 2 from the alcohol tank 1. The mixture of air and alcohol vapor passes through line 19 into the reactor 3. The reactor 3 is heated by exhaust gas from the engine 4. The exhaust gas passes through line 25 to the reactor 3. The line 25 has valve 26 therein to limit the flow of exhaust gas to the reactor 3. Exhaust gas leaves the reactor 3 through line 27. The vaporizer 2 is provided with a line 29 through which hot engine coolant is passed from the engine to the vaporizer 2. Engine coolant passes from the vaporizer 2 through line 30. Line 30 is connected to engine 4. The filter 6 is connected to the reactor 3 by line 31. The filter 6 removes solids from the hydrogen rich gaseous mixture passing therethrough. The filter 6 is connected by line 32 to the engine 4. Valve 36 in line 32 is provided to limit the flow of the hydrogen rich gaseous fuels to the engine. The valves 24 and 36 completely block the dissociation system including vaporizer to the filter when the system is not in operation. Line 8 is connected to the line 33. Line 33 is connected to the engine 4. Hydrogen rich gas in line 32 mixes with air from line 8 in the line 33. Liquid alcohol passes through line 7 to line 33. The valve 34 in line 7 limits the flow of liquid alcohol therethrough. The liquid alcohol passing through line 7 is atomized prior to being fed to the engine 4.

Preferred alcohols for use as the alcohol fuel in the alcohol tank 1 include methanol and ethanol. The most preferred alcohol for use as the alcohol fuel is methanol.

At high output temperatures (for example 600° F.) from the catalyst bed, the engine exhaust gas, valve 26 which is at least partially closed and valve 28 is opened by temperature switch TS. This is to protect the catalyst from overheating. Valve 28 is line 38 is first opened to send hot exhaust gas to the superheater 5 before closing valve 26. The reaction temperature within the reactor 3 is maintained in part by the rate of partial combustion. The rate of partial combustion is controlled by the amount of air injected through line 15 by control of valve 35. Valve 35 may be a fixed opening orifice valve, or other fixed or variable opening valve. The air feed rate through this valve is fixed at the amount of air required for adiabatic methanol dissociation to carbon monoxide and hydrogen at the lowest methanol throughput of the reactor which occurs when the engine has the least fuel demand during idling (i.e. minimum adiabatic dissociation). At a higher methanol throughput the hot engine exhaust gas provides the heat required for the endothermic dissociation of the incremental methanol over that at minimum adiabatic dissociation. Since the exhaust temperature increases with increases in the engine load, the heat available from the exhaust gas for the endothermic conversion also increases with the load increase. Thus, more methanol is endothermically dissociated at higher loads.

During reactor cold start, exhaust from the engine passes into the heat exchange chamber of reactor 3 through line 25 and valve 26. The exhaust leaves the heat exchange chamber through line 27. While the reactor is being heated up to the operational temperature, valve 28 in line 38 is closed so that exhaust from line 37 passes into line 25 and into the heat exchange chamber of the reactor 3. The exhaust gas leaving the reactor 3 through line 27 enters the superheater 5 through line 39 and leave the superheater through lines 40 and 74 to vent. Valve 44 in line 45 is closed during this period. During this period the vaporizer 2 is heated with engine coolant. The valve 44 controls the exhaust gas flow to the superheater 5 to give the temperature of the methanol vapor from the superheater 5 at the specified inlet temperature for the reactor 3. The vaporizer 2 is optional. Thus, liquid methanol may be fed directly into the superheater 5 from the methanol or alcohol storage tank 1. Alternatively engine exhaust may be passed from the output line 40 of the superheater 5 into the feedline 29 of the vaporizer 2. In which case, engine coolant would not be fed into the feedline 29 of vaporizer 2.

The air being fed through line 15 may be preheated by preheater 41. The preheater 41 may be fed exhaust from line 37 to provide the preheating heat for air being fed through line 15 into line 20. Beneficially the preheated air does not lower the temperature of the liquid alcohol and/or alcohol vapor being fed to the superheater 5 through line 20.

Overall Fuel System

The drawing shows a schematic flow diagram of the fuel system of the invention. Major components of the fuel system are a vaporizer 2, a superheater 5, a filter 6, and by-pass line 7 in addition to the reactor.

In the vaporizer 2 the engine coolant, normally at 200°–220° F., provides the heat for the methanol vaporization. In the superheater, the methanol temperature is raised to the desired reactor inlet temperature by heat exchange with the exhaust gas. The vaporizer 2 is optional because the superheater may be used for the methanol vaporization and superheating by directly feeding liquid methanol into it. Air is injected through line 15 to the alcohol feed stream normally before the superheater in order to allow enough time for mixing of the air and alcohol prior to the reactor. The filter 6 collects fines from the catalyst bed.

The by-pass line 7 delivers liquid alcohol directly to the engine as required during cold start or high load driving (acceleration or high speed driving). During cold start, the engine 4 must run on liquid or vaporized alcohol until the dissociation reactor completes its start-up phase. During high load driving the fuel requirement in excess of the maximum throughput of the reactor is provided with liquid alcohol from tank 1 delivered through the by-pass line 7.

The direct feeding of liquid alcohol in excess of the maximum throughput of the reactor may be beneficial for overall car performance without significantly reducing the benefits of the dissociation. The liquid alcohol fed to the engine will boost the engine power by increasing the energy density of the combined fuel when the power is needed at high load conditions. Further, it may lower the $NO_x$ emissions by reducing the combustion temperature in the engine.

EXAMPLE

Cold Starts

Since the cold start of the reactor requires hot engine exhaust gas for preheating of the catalyst bed the engine 4 must be turned on by a method independent of the methanol conversion system. During this period the engine may run on liquid alcohol delivered through the by-pass line.

Once the catalyst bed temperature in the reactor has risen to the initial operating temperature, superheated alcohol is fed to the reactor with fixed air injection through line 15 for minimum adiabatic dissociation. Because of the exothermic heat generated by partial combustion of alcohol, the catalyst bed temperature will further rise until endothermic alcohol dissociation becomes effective.

For a 20/10 Cu/Ni catalyst on silica the bed temperature for initiating the partial combustion reaction for methanol is about 300° F. or above. A lower temperature is acceptable if a more active catalyst is used.

The engine can be started independently with a gaseous start-up fuel such as propane, electrically vaporized methanol or finely atomized methanol.

Alcohol Conversion

Once the cold start phase of the reactor is completed, the reactor is operated with minimum adiabatic dissociation and incremental endothermic dissociation with fixed rate air injection.

With a dual catalyst bed of Cu/Ni and Cu/Zn catalysts, the following three reactions take place as major reactions:

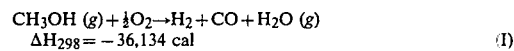
(I)

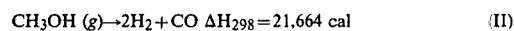
(II)

$$H_2O\,(g) + CO \rightarrow H_2 + CO_2 \quad \Delta H_{298} = -9{,}838 \text{ cal} \qquad (III)$$

Methanol is first converted via Reactions (I) and (II) in the Cu/Ni catalyst zone and the remaining methanol is converted via Reactions (II) and (III) in the following Cu/Zn catalyst zone. Because Reaction (I) is very fast on a Cu/Ni catalyst, oxygen is rapidly consumed to completion in the zone. The rapid progress of Reaction (I) creates a temperature peak in the zone. After the depletion of oxygen the endothermic reaction (Reaction (II)) becomes dominant and, thus, cools down the bed temperature. The gas leaving the reactor is very close to equilibrium for the water/gas shift reaction because of the excellent shift activity of the Cu/Zn catalyst. The Cu/Zn catalyst may be unpromoted or promoted with a promotor such as chromium.

Having thus described the invention by reference to certain of its preferred embodiments it is respectfully pointed out that embodiments described are illustrative rather than limiting in nature and that many variations and modifications are possible within the scope of the present invention. Such variations and modifications may appear obvious and desirable to those skilled in the art upon a review of the foregoing description of preferred embodiments.

Having thus described the invention, I claim:

1. A method of fuel treatment and distribution for an internal combustion engine comprising the sequence of steps as follows:
   (a) heating a catalyst bed reactor to a start-up temperature using exhaust gas from an internal combustion engine being operated on atomized alcohol; said catalyst bed comprising a partial combustion catalyst and an alcohol dissociation catalyst;
   (b) vaporizing liquid alcohol to form alcohol vapor;
   (c) mixing said alcohol vapor with a fixed flow rate of air to form a partial combustion mixture, said flow rate being substantially fixed at about the flow rate required for adiabatic dissociation of said alcohol vapor at the flow rate of said alcohol vapor during idling of said internal combustion engine;
   (d) contacting said partial combustion mixture and said partial combustion catalyst and said dissociation catalyst to form a hydrogen-rich fuel;
   (e) mixing air and said hydrogen rich fuel to form a total combustion mixture;
   (f) burning said total combustion mixture in an internal combustion engine.

2. The method of claim 1 wherein said partial combustion catalyst is Cu/Ni and said dissociation catalyst is Cu/Zn.

3. The method of claim 1 wherein said alcohol is methanol.

4. The method of claim 1 wherein said dissociation catalyst is Cu/Zn.

5. The method of claim 1 wherein said dissociation catalyst is Cu/Cr.

6. The method of claim 5 wherein said Cu/Cr dissociation catalyst is promoted with Mn.

7. The method of claim 1 wherein said partial combustion catalyst is Cu/Cr and said dissociation catalyst is Cu/Cr.

8. The method of claim 7 wherein said Cu/Cr catalysts are each promoted with Mn.

* * * * *